United States Patent
Kubo et al.

(10) Patent No.: US 7,106,371 B1
(45) Date of Patent: Sep. 12, 2006

(54) PIXEL DEFECT DETECTOR FOR SOLID-STATE IMAGING DEVICE

(75) Inventors: Noboru Kubo, Ikoma (JP); Xiaomang Zhang, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/391,473

(22) Filed: Sep. 8, 1999

(30) Foreign Application Priority Data

Aug. 9, 1998 (JP) .................................. 10-254428

(51) Int. Cl.
H04N 9/64 (2006.01)
(52) U.S. Cl. .................................................. 348/246
(58) Field of Classification Search ................ 348/246, 348/247, 187
See application file for complete search history.

(56) References Cited

U.S. PATENT DOCUMENTS

| | | | | |
|---|---|---|---|---|
| 4,253,120 A | * | 2/1981 | Levine | 348/246 |
| 4,602,291 A | * | 7/1986 | Temes | 348/246 |
| 4,748,507 A | * | 5/1988 | Gural | 348/246 |
| 5,047,861 A | * | 9/1991 | Houchin et al. | 348/247 |
| 5,047,863 A | * | 9/1991 | Pape et al. | 348/247 |
| 5,416,516 A | * | 5/1995 | Kameyama et al. | 348/246 |
| 5,696,554 A | * | 12/1997 | Hwang | 348/246 |
| 5,995,163 A | * | 11/1999 | Fossum | 348/572 |
| 6,028,628 A | * | 2/2000 | Van Der Valk | 348/246 |
| 6,034,794 A | * | 3/2000 | Suganuma | 358/518 |
| 6,184,529 B1 | * | 2/2001 | Contini | 250/252.1 |
| 6,396,539 B1 | * | 5/2002 | Heller et al. | 348/246 |
| 6,683,643 B1 | * | 1/2004 | Takayama et al. | 348/247 |
| 6,806,902 B1 | * | 10/2004 | Donovan | 348/246 |
| 2003/0090580 A1 | * | 5/2003 | Petropoulos et al. | 348/254 |
| 2004/0169746 A1 | * | 9/2004 | Chen et al. | 348/246 |

FOREIGN PATENT DOCUMENTS

| | | |
|---|---|---|
| DE | 37 33 074 A | 4/1989 |
| EP | 0 762 741 A2 | 3/1997 |
| JP | 60-241370 | 7/1986 |
| JP | 61-227481 | 10/1986 |
| JP | 02 071682 A | 3/1990 |
| JP | 02 206976 A | 8/1990 |
| JP | 04-081178 | 3/1992 |
| JP | 07-030906 | 1/1995 |
| JP | 08-181917 | 7/1996 |
| JP | 8-195909 | 7/1996 |

OTHER PUBLICATIONS

Dierickx, Bart. "Missing pixel correction algorithm for image sensors." Apr. 9, 1998. SPIE.*
*A Circuit for the Correction of Pixel Defects in Image Sensors*, Guy Meynants, et al., Proceedings of the European Solid State Circuits Conference, XX, XX, 1998, pp. 312-315, XP000884997 Section 2. European Search Report.

* cited by examiner

*Primary Examiner*—Tuan Ho
*Assistant Examiner*—Jason Whipkey
(74) *Attorney, Agent, or Firm*—David G. Conlin; Steven M. Jensen; Edwards Angell Palmer & Dodge, LLP

(57) ABSTRACT

A pixel defect detector of the present invention is used for a solid-state imaging device comprising a plurality of photoelectric transducers. The pixel defect detector includes: a calculation section for obtaining output characteristics of a subject photoelectric transducer for varied amounts of light incident thereupon so as to determine the presence/absence of a defect in the subject photoelectric transducer based on the output characteristics thereof.

17 Claims, 5 Drawing Sheets

FIG.2

```
        mask1              mask2
0 ┌─────────┼──────────────────┼──────────────────→ i
  R  G  R  G  R  G  R  G  R  G  R  G  R  G ...
  G  B  G  B  G  B  G  B  G [B₀] G [B₀] G [B₀] G  B ...
  R  G [R₀] G [R₀] G [R₀] G  R  G  R  G  R  G ...
  G  B │G  B  G  B  G│ B  G [B₀] G [B₁] G [B₀] G  B ...
  R  G │[R₀] G [R₁] G [R₀]│ G  R  G  R  G  R  G ...
  G  B │G  B  G  B  G│ B  G [B₀] G [B₀] G [B₀] G  B ...
  R  G [R₀] G [R₀] G [R₀] G  R  G  R  G  R  G ...
  G  B  G  B  G  B  G  B  G  B  G  B  G  B ...
  R  G  R [G₀] R [G₀] R [G₀] R  G  R  G  R  G ...
  G  B  G │B  G  B  G│ B  G  B [G₀] B [G₀] B  G  B ...
  R  G  R │[G₀] R [G₁] R [G₀]│ G  R │[G₁] R│ G  R  G ...
  G  B  G │B  G  B  G│ B  G  B [G₀] B [G₀] B  G  B ...
  R  G  R [G₀] R [G₀] R [G₀] R  G  R  G  R  G ...
  G  B  G  B  G  B  G  B  G  B  G  B  G  B ...
j ↓ ...  ...  ...  ...  ...  ...  ...  ...  ...
        mask3              mask4
```

PIXEL DEFECT DETECTOR FOR SOLID-STATE IMAGING DEVICE

BACKGROUND OF THE INVENTION

1. Field of the Invention

The present invention relates to a pixel defect detector which is provided in a solid-state imaging device such as a CCD for automatically detecting a defect produced in the solid-state imaging device.

2. Description of the Related Art

It is generally known in the art that the quality of a solid-state imaging device such as a CCD may deteriorate due to a local crystal defect (also referred to as a "blemish") which is produced therein while being manufactured. Moreover, an additional blemish may be produced in the solid-state imaging device after shipping by the irradiation of cosmic rays. Such blemishes can be classified into white blemishes and black blemishes.

FIG. 6 shows a graph illustrating output characteristics in response to the amount of incident light of different photoelectric transducers (referred to also as "pixels") provided in a solid-state imaging device. In FIG. 6, the solid line A represents an output characteristic of a normal pixel, the broken line B represents that of a pixel having a white blemish, and the one-dot chain line C represents that of a pixel having a black blemish. As can be seen from the output characteristic represented by the broken line B, a white blemish is a defect due to which a bias voltage is always added to an output of the pixel. Moreover, as can be seen from the output characteristic represented by the one-dot chain line C, a black blemish is a defect by which the sensitivity of the pixel is reduced.

Conventionally, various devices and methods have been proposed in the art for detecting such a blemish in a pixel and correcting the output of such a pixel.

For example, Japanese Laid-Open Publication No. 8-195909 discloses an arrangement comprising: a ROM for storing data representing the position and the level of a CCD blemish which is already present prior to shipping; and an EEPROM for storing data representing the position and the level of a CCD blemish which is additionally produced after the shipping. According to this arrangement, the output of the CCD having a blemish is corrected based on the data stored in the ROM and the data stored in the EEPROM.

Japanese Laid-Open Publication No. 7-7675 discloses a technique in which a blemish of a CCD is detected after performing an inverse γ correction on an output signal of the CCD. The inverse γ correction is performed because once a γ correction is performed, the amount of error occurring in the output signal of the CCD due to the blemish is reduced, whereby the blemish detection is difficult.

Japanese Laid-Open Publication No. 62-8666 discloses a technique of substituting the output signal of a pixel having a blemish with the output signal of another pixel in the same row or column.

In the prior art, however, the detection of a blemish in a solid-state imaging device either before or after shipping requires a reference light generator for producing various (dark to bright) levels of reference light incident upon the device, an aided system, and the like. Moreover, in the prior art, the detection of a blemish in a pixel and the correction of the output from the pixel may be difficult for anyone but an expert operator. These operations are far from those which can ordinarily be done by a user.

SUMMARY OF THE INVENTION

According to one aspect of this invention, a pixel defect detector for a solid-state imaging device comprising a plurality of photoelectric transducers is provided. The pixel defect detector includes: a calculation section for obtaining output characteristics of a subject photoelectric transducer for varied amounts of light incident thereupon so as to determine the presence/absence of a defect in the subject photoelectric transducer based on the output characteristics thereof.

In one embodiment of the invention, the pixel defect detector further includes a picture memory for storing an output signal from the photoelectric transducer. The calculation section determines the output characteristics of the subject photoelectric transducer using the output signal of the subject photoelectric transducer stored in the picture memory.

In one embodiment of the invention, the output characteristics of the subject photoelectric transducer are represented by a plurality of output signals of the subject photoelectric transducer in response to different amounts of light incident thereupon, respectively.

According to another aspect of this invention, a pixel defect detector for a solid-state imaging device comprising a plurality of photoelectric transducers is provided. The pixel defect detector includes: a picture memory for storing outputs from a subject photoelectric transducer in response to different amounts of light incident thereupon, respectively; and a calculation section for determining a photoelectric coefficient a of the subject photoelectric transducer and an offset output level b of the subject photoelectric transducer in the absence of incident light based on the amounts of incident light, the outputs from the subject photoelectric transducer therefor, and Expression (1) below, so as to compare the photoelectric coefficient a and the offset output level b with a predetermined reference photoelectric coefficient $a_0$ and a predetermined reference offset output level $b_0$, respectively, thereby determining the presence/absence of a defect in the subject photoelectric transducer:

$$y(x)=ax+b \quad (1)$$

where y(x) denotes the output of the subject photoelectric transducer, and x denotes the amount of incident light.

In one embodiment of the invention, the pixel defect detector further includes an optical system for projecting a picture onto the solid-state imaging device. The output of the photoelectric transducer is determined while the optical system is defocused with respect to the solid-state imaging device.

In one embodiment of the invention, the amounts of light incident upon the subject photoelectric transducer comprise an amount of incident light when no light is incident upon the solid-state imaging device and another amount of incident light which brings the solid-state imaging device to a near-overflow state.

In one embodiment of the invention, the amount of incident light x is determined by applying, to Expression (2) below, the predetermined reference photoelectric coefficient $a_0$, the predetermined reference offset output level $b_0$, and a reference output signal $y_0$:

$$x=(y_0-b_0)/a_0 \quad (2).$$

In one embodiment of the invention, the output $y_0$ is set to a median among outputs from a plurality of photoelectric transducers neighboring the subject photoelectric transducer.

In one embodiment of the invention, the neighboring photoelectric transducers comprise only those which display the same one of a plurality of colors to be displayed as that of the subject photoelectric transducer.

In one embodiment of the invention, the presence/absence of a defect in the subject photoelectric transducer is determined by applying the photoelectric coefficient a of the subject photoelectric transducer, the offset output level b of the subject photoelectric transducer, the reference photoelectric coefficient $a_0$, and the reference offset output level $b_0$, to Expression (3) below:

$$\text{no defect, if } |a_0 - a| < \Delta a \text{ and } |b_0 - b| < \Delta b \quad (3)$$

where $\Delta a$ and $\Delta b$ are predetermined threshold values.

In one embodiment of the invention, the presence/absence and the type of defect in the subject photoelectric transducer are determined by applying the photoelectric coefficient a of the subject photoelectric transducer, the offset output level b of the subject photoelectric transducer, the reference photoelectric coefficient $a_0$, and the reference offset output level $b_0$, to Expression (4) below:

$$\text{no defect, if } |a_0 - a| < \Delta a \text{ and } |b_0 - b| < \Delta b;$$

$$\text{a black blemish, if } |a_0 - a| \geq \Delta a; \text{ and}$$

$$\text{a white blemish, if } |b_0 - b| \geq \Delta b \quad (4)$$

where $\Delta a$ and $\Delta b$ are predetermined threshold values.

In one embodiment of the invention, the reference photoelectric coefficient $a_0$ and the reference offset output level $b_0$ are prescribed for each of the colors to be displayed.

In one embodiment of the invention, the pixel defect detector further includes a determination section for determining a color to be displayed by the subject photoelectric transducer based on address data of the subject photoelectric transducer. The reference photoelectric coefficient $a_0$ and the reference offset output level $b_0$ are prescribed based on the determination by the determination section.

Thus, the invention described herein makes possible the advantages of providing a pixel defect detector for a solid-state imaging device, which does not require a reference light generator, a special aided system, or the like, and with which the detection can be easily done by a user.

These and other advantages of the present invention will become apparent to those skilled in the art upon reading and understanding the following detailed description with reference to the accompanying figures.

BRIEF DESCRIPTION OF THE DRAWINGS

FIG. 2 is a plan view illustrating an arrangement of the primary colors in a color filter according to a primary colors Bayer pattern;

DESCRIPTION OF THE PREFERRED EMBODIMENTS

First, the general description of the present invention will be below.

As described above, the prior art procedure of applying reference light from a reference light generator across a solid-state imaging device, detecting a pixel having a blemish based on an output signal of the solid-state imaging device using a special aided system, and then correcting the output of such a pixel, is far from that which can ordinarily be done by a user.

Figure 1:
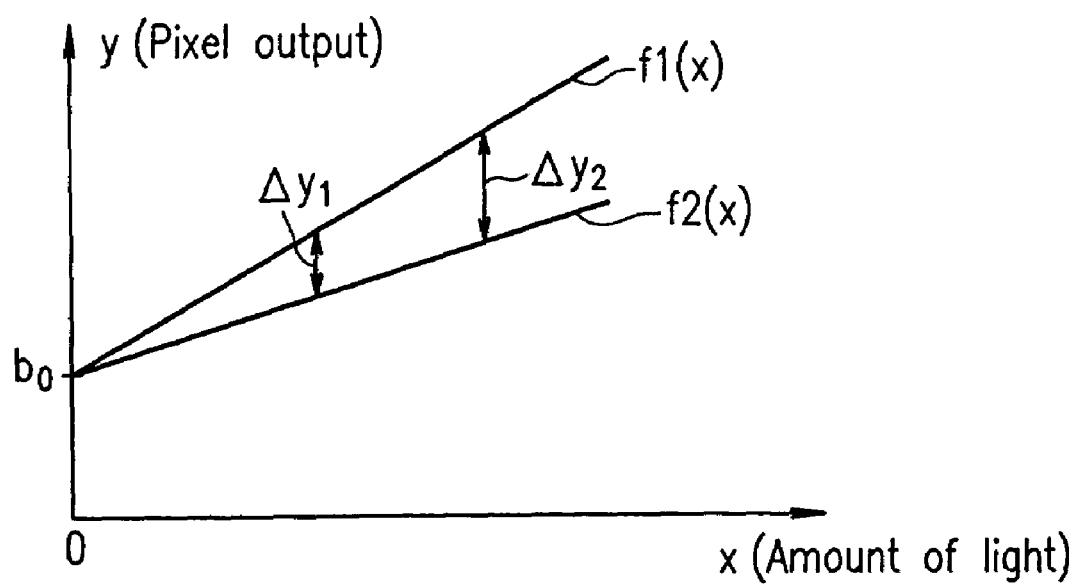
FIG. 1 is a graph illustrating input/output characteristics of a photoelectric transducer.

It is assumed in the present invention that no reference light generator for applying reference light is used. In such a case, the amount of light incident upon the solid-state imaging device cannot be determined, and a pixel having a blemish cannot be identified simply by comparing an output signal of a pixel with that of another neighboring pixel. For example, referring to the graph of FIG. 1, when comparing an output characteristic $f1(x)$ of a normal (i.e., not blemished) pixel in response to an amount of incident light with an output characteristic $f2(x)$ of a pixel having a black blemish in response to an amount of incident light, the difference (e.g., $\Delta y1$ or $\Delta y2$) between the output characteristic $f1(x)$ and the output characteristic $f2(x)$ varies depending upon the amount of incident light. Therefore, a pixel having a blemish cannot be identified based on such a difference unless the amount of incident light can be accurately determined. When one attempts to determine the presence/absence of a blemish based on only one difference between the output characteristic $f1(x)$ and the output characteristic $f2(x)$, the presence/absence of a blemish cannot be determined in a precise manner, as a white blemish and a black blemish cannot be accurately distinguished from each other.

Thus, according to the present invention, a pixel having a blemish is identified by using a function of Expression (1) below which represents the output characteristic of a pixel of the solid-state imaging device.

$$y(x) = ax + b \quad (1)$$

Herein, $y(x)$ denotes an output level of a pixel (or a photoelectric transducer) being examined (hereinafter, a "subject pixel"), x denotes an amount of incident light, a denotes a photoelectric coefficient of the pixel, and b denotes an offset output level of the pixel in the absence of incident light.

When comparing the function of one normal pixel with that of another normal pixel, the values of the coefficients a and b for one pixel are close to those for the other pixel, respectively. Moreover, the values of the coefficients a and b for each normal pixel are substantially equal to an average reference photoelectric coefficient $a_0$ and an average reference offset output level $b_0$. For a pixel having a black blemish, the photoelectric coefficient a is smaller than the reference photoelectric coefficient $a_0$. For a pixel having a white blemish, the offset output level b is larger than the reference offset output level $b_0$.

The photoelectric coefficient a and the offset output level b of one pixel are constant regardless of the amount of light incident thereupon. Therefore, the presence/absence and the type of defect of the pixel can be determined by obtaining the above-described function for the pixel.

When N different amounts of incident light (from dark to bright), $x_0, x_1, \ldots, X_{N-1}$, are applied to a subject pixel, thereby obtaining N output levels, $y_0, y_1, \ldots, y_{N-1}$, corresponding to the subject pixel, the input/output relationship of the subject pixel can be represented by Expression (5), which is below based on Expression (1) above.

$$\begin{bmatrix} y_0 \\ y_1 \\ \vdots \\ y_{N-1} \end{bmatrix} = \begin{bmatrix} x_0 & 1 \\ x_1 & 1 \\ \vdots \\ x_{N-1} & 1 \end{bmatrix} \begin{bmatrix} a \\ b \end{bmatrix} \quad (5)$$

By using a least squares method, the photoelectric coefficient a and the offset output level b of a subject pixel can be obtained by applying the amount of light $x_i$ incident upon the subject pixel and the actual output level $y_i$ for the amount of light x to Expression (7) below, on the condition that the sum σ of squares of errors obtained by Expression (6) below is minimized (for the least squares method, see, for example, "Sensor and Signal Processing System II", pp. 10–11, 1985, Japan Society of Mechanical Engineers eds, published by Asakura Shoten).

$$\sigma = \sum_{i=0}^{N-1} (y(x_i) - y_i)^2 \quad (6)$$

$$\begin{bmatrix} \sum x_i^2 & \sum x_i \\ \sum x_i & N \end{bmatrix} \begin{bmatrix} a \\ b \end{bmatrix} = \begin{bmatrix} \sum x_i y_i \\ \sum y_i \end{bmatrix} \quad (7)$$

Since no reference light generator is used in the present invention, the amount of light $x_i$ incident upon a subject pixel is not the amount of reference light, and thus is not readily specified. Therefore, the amount of incident light $x_i$ is estimated before obtaining the photoelectric coefficient a and the offset output level b from Expression (7) above.

In order to estimate the amount of light $x_i$ incident upon the subject pixel, the outputs of the subject pixel and the neighboring pixels within a prescribed pixel region are examined as follows. The term "pixel region" as used in this specification refers to a prescribed region on an imaging screen within which is included a number of pixels, including the subject pixel. The output levels of some or all of the number of pixels are examined to estimate the amount of light incident upon the subject pixel. For example, the outputs of the subject pixel and other neighboring pixels, which are located along the upper, lower, left and right sides of the subject pixel, are examined. Hereinafter, an example having an amount $x_0$ of incident light will be explained. If the number of pixels having the same type of defect is less than or equal to half of the number of the selected pixels, it is possible to obtain an output level of a normal pixel by obtaining the median $y_0$ of the output levels of the selected pixels through a median filter represented by Expression (8) below.

$$\bar{y} = \text{median}\{y_1, y_2, y_3, y_4, y_5\} \quad (8)$$
$$= y_1; \text{ when } y_2 < y_3 < y_1 < y_4 < y_5$$

Herein, $y_i$ (i=1, . . . , 5) denotes the output level of the five pixels selected from the same pixel region.

For example, where $y_1$ denotes the output level of a normal pixel, $y_2$ and $y_3$ denote the output levels of pixels having a black blemish (smaller than the output level of the normal pixel), and $y_4$ and $y_5$ denote the output levels of pixels having a white blemish (larger than the output level of the normal pixel), then, the median $y_0$ obtained through the median filter is equal to the output level $y_1$ of the normal pixel. Alternatively, when only normal pixels are selected from a pixel region, the median among the output levels of the normal pixels is obtained.

Once an output level $y_0$ of a normal pixel is obtained, it is possible to obtain the amount of light x incident upon the subject pixel by applying the output level $y_0$ to Expression (2) below.

$$x = (y_0 - b_0)/a_0 \quad (2)$$

Herein, $a_0$ denotes an average reference photoelectric coefficient among the normal pixels, and $b_0$ denotes an average reference offset output level among the normal pixels.

The output level $y_0$ of a normal pixel in the pixel region is obtained for each of N different amounts of light (from dark to bright), $x_0, x_1, \ldots, x_{N-1}$, being applied. The output level $y_0$ is applied to Expression (2) above, so as to calculate each of the amounts of incident light, $x_0, x_1, \ldots, x_{N-1}$.

Once the amounts of light, $x_0, x_1, \ldots, x_{N-1}$, incident upon the subject pixel are determined as described above, it is possible to determine the photoelectric coefficient a and the offset output level b of the subject pixel by applying, to Expression (7) above, the determined amounts of incident light and the actual output levels $y_0, y_1, \ldots, y_{N-1}$, from the subject pixel in response to the amounts of incident light.

For displaying multiple colors, the reference photoelectric coefficient $a_0$ varies for the respective colors to be displayed. For example, in order to produce a color display with the three primary colors R, G and B, it may be necessary to prescribe a reference photoelectric coefficient $a_0$ for each of the primary colors R, G and B. In such a case, a subject pixel in a pixel region and pixels which are in the same pixel region and which represent the same color as that of the subject pixel are selected, and the median output level among the selected pixels is obtained by Expression (8) above. Then, the amount of incident light x is calculated based on Expression (2) above, and the photoelectric coefficient a is calculated based on Expression (7) above.

Instead of $a_0$ in Expression (2) above, values $a_{0R}$, $a_{0G}$ and $a_{0B}$ are used which denote predetermined reference photoelectric coefficients for the primary colors R, G and B, respectively. Moreover, the photoelectric coefficients obtained for the primary colors R, G and B are denoted by $a_R$, $a_G$ and $a_B$, respectively.

It is not necessary to obtain the offset output level b and the reference offset output level $b_0$ for each of the primary colors, but these values can be commonly used among the primary colors.

Where no special device, such as a reference light generator, is used as in the present invention, it is very difficult to make a uniform amount of light be incident across the solid-state imaging device. Therefore, in the present invention, it may be necessary to minimize the size of a pixel region including the subject pixel so that a uniform amount of light is incident across the pixel region.

FIG. 2 illustrates a color filter of a primary colors Bayer pattern. When such a color filter is employed for producing a color display, a pixel region mask1 is prescribed surrounding a subject pixel R1 for the primary color R, and nine pixels $R_1$, $R_0$ are selected from the pixel region mask1 to obtain the amount of light incident upon the subject pixel. Similarly, for the primary color B, a pixel region mask2 is prescribed surrounding a subject pixel B1 and nine pixels $B_1$, $B_0$ are selected from the pixel region mask2 to obtain the amount of light incident upon the subject pixel. For the primary color G, a pixel region mask3 or mask4 is prescribed surrounding a subject pixel G1 and nine or five pixels $G_1$, $G_0$ are selected from the pixel region mask3 or mask4 to obtain the amount of light incident upon the subject pixel.

The relatively small pixel region mask4 is used to obtain an accurate amount of light incident upon the subject pixel G1 because the human eye is most sensitive to the primary color G of the three primary colors.

In this way, the amount of incident light and the output level are obtained for each subject pixel, so as to obtain one of the photoelectric coefficients $a_R$, $a_G$ and $a_B$ corresponding to the color displayed by the subject pixel, and the reference offset output level $b_0$ which is common to the primary colors R, G and B. Then, the presence/absence and the type of defect are determined based on Expressions (9), (10) and (11) below.

Where the subject pixel displays the primary color R, the subject pixel has:

no defect if $|a_{0R}-a_R|<\Delta a_R$ and $|b_0-b|<\Delta b_R$;

a black blemish if $|a_{0R}-a_R|\geq\Delta a_R$; and a white blemish if $|b_0-b|\geq\Delta b_R$.   (9)

Where the subject pixel displays the primary color B, the subject pixel has:

no defect if $|a_{0B}-a_B|<\Delta a_B$ and $|b_0-b|<\Delta b_B$;

a black blemish if $|a_{0B}-a_B|\geq\Delta a_B$; and a white blemish if $|b_0-b|\geq\Delta b_B$.   (10)

Where the subject pixel displays the primary color G, the subject pixel has:

no defect if $|a_{0G}-a_G|<\Delta a_G$ and $|b_0-b|<\Delta b_G$;

a black blemish if $|a_{0G}-a_G|>\Delta a_G$; and a white blemish if $|b_0-b|\geq\Delta b_G$.   (11)

Herein, $\Delta a_R$, $\Delta a_B$, $\Delta a_G$, and $\Delta b_R$, $\Delta b_B$, $\Delta b_G$ are threshold values, which are prescribed separately for the respective primary colors R, G and B so as to improve the detection/determination precision.

In order to obtain the photoelectric coefficient a and the offset output level b based on Expression (7) above, the left side of Expression (7) needs to be non-zero, i.e., Expression (12) below needs to hold. In other words, the series of N functions in Expression (5) above need to be independent from one another. Under a condition close to the ideal condition (e.g., where substantially no white noise exists), the series of N functions are correlated to one another, whereby Expression (12) below does not hold. Then, the photoelectric coefficient $a=a_0$, and the offset output level $b=b_0$.

$$\left|\begin{matrix}\sum x_i^2 & \sum x_i \\ \sum x_i & N\end{matrix}\right|\neq 0 \quad (12)$$

In the manner as described above, the presence/absence and the type of defect are determined for each subject pixel. Then, if a subject pixel has a defect, the output level of the pixel will be corrected.

The bias voltage added to the output of a pixel having a white blemish varies depending upon the temperature, while the sensitivity of a pixel having a black blemish is deteriorated. Therefore, simple addition or subtraction of a constant voltage to/from the output of such a pixel may not sufficiently correct the output of the pixel. It is preferred to correct the output signal of a pixel having a defect using the output signal of each of one or more neighboring pixels.

For correcting the output signal of the pixel having a defect, using the output signal of each of one or more pixels which are horizontally neighboring the subject pixel along with those of one or more pixels which are vertically neighboring the subject pixel is more preferred for the following reason than using only the output signal of one or more pixels which are neighboring the subject pixel either in the horizontal or vertical direction. For example, when the subject pixel having a defect is located along an edge of the object being imaged, the output of a pixel horizontally neighboring the subject pixel is likely to be substantially different from that of a pixel vertically neighboring the subject pixel. In such a case, correcting the output signal of the subject pixel using only the output signal of a pixel neighboring the subject pixel either in the horizontal or vertical direction may result in false colors.

Moreover, it is preferred to perform the output level correction separately for the respective primary colors to be displayed. For example, where the primary colors R, G and B are displayed, it is preferred to perform a more precise correction for the primary color G using the color distribution of the primary colors Bayer pattern because the primary color G is more important than the other primary colors R and B.

For example, as illustrated in FIG. 2, the pixel region mask1 is prescribed surrounding the subject pixel R1 for the primary color R, while the pixel region mask2 is prescribed surrounding the subject pixel B1 for the primary color B. Assuming that the corrected output level of the subject pixel R1 or B1 is y(i,j), the average of the output levels of the other eight pixels, which are in the same pixel region and which represent the same color as that of the subject pixel R1 or B1, is determined based on Expression (13) below.

$y(i,j)=[y(i-2,j-2)+y(i,j-2)+y(i+2,j-2)+y(i-2,j)+y(i+2,j)+y(i-2,j+2)+y(i,j+2)+y(i+2,j+2)]/8$   (13)

For the primary color G, the pixel region mask4 is prescribed surrounding the subject pixel G1, also as illustrated in FIG. 2. Assuming that the corrected output level of the subject pixel G1 is y(i,j), the average of the output levels of the other four pixels, which are in the same pixel region and which represent the same color as that of the subject pixel G1, is determined based on Expression (14) below.

$y(i,j)=[y(i-1,j-1)+y(i+1,j-1)+y(i-1,j+1)+y(i+1,j+1)]/4$   (14)

In Expressions (13) and (14), designations such as "(i,j)" denote coordinate points.

The relatively small pixel region mask4 is used to obtain an accurate amount of light incident upon the subject pixel G1 because the human eye is most sensitive to the primary color G of the three primary colors.

A pixel defect detector according to one embodiment of the present invention is used for detecting a pixel defect in a solid-state imaging device (e.g., a CCD) such as a digital still camera. The digital still camera is provided with a special mode of operation for the pixel defect detection. In the special mode, the detection of a defect in a solid-state imaging device is substantially automatically performed in response to a predetermined operation by a user. Thus, the position of a pixel having a defect and the output characteristics of the pixel are recorded. Then, in a normal shooting mode, output signals from each pixel having a defect are corrected based on the recorded data.

For the pixel defect detection, a γ correction is not performed on the output signal of the solid-state imaging device so that the amount of error occurring in the output signal from the pixel having a defect will not be reduced.

In the pixel defect detector according to this embodiment of the present invention, the output characteristics of the solid-state imaging device are determined by applying varied amounts of light to the solid-state imaging device. Various functions of the digital still camera such as the diaphragm, the strobe, and the shutter speed, may be used alone or in combination so as to vary the amounts of light incident upon the solid-state imaging device.

In the pixel defect detection mode, the digital still camera is preferably defocused so that a uniform level of light is incident across the solid-state imaging device. For example, even when a wall or a panel having a uniform gray level is imaged by the digital still camera so as to obtain a uniform level of light incident across the solid-state imaging device, there may be some non-uniformity in the gray level of the object and/or some non-uniformity in the illumination for the object. By defocusing the digital still camera, it is possible to blur such non-uniformity, thereby applying a more uniform level of light incident across the solid-state imaging device.

Figure 3:
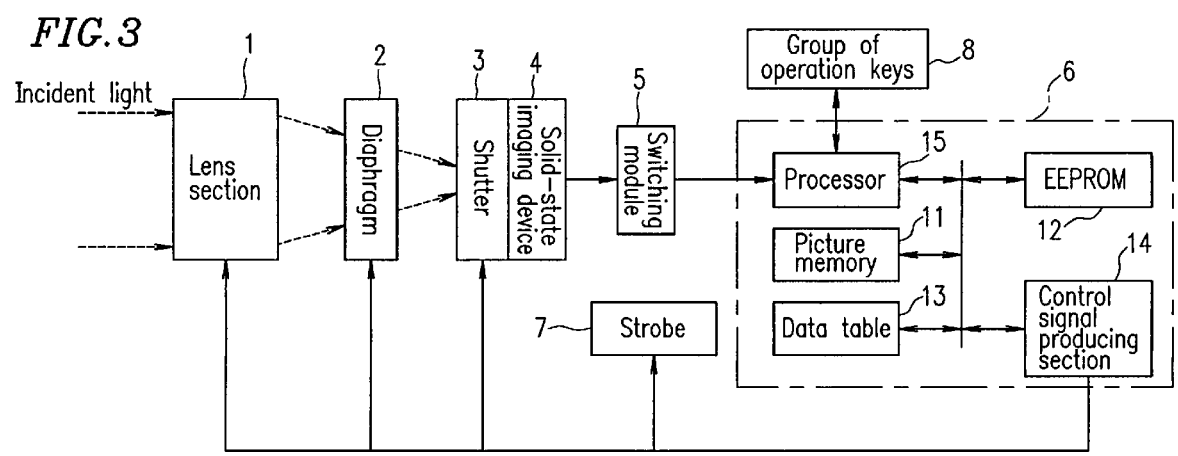
FIG. 3 is a block diagram illustrating a digital still camera incorporating a pixel defect detector according to one embodiment of the present invention.

FIG. 3 is a block diagram illustrating a digital still camera incorporating the pixel defect detector according to one embodiment of the present invention. Referring to FIG. 3, light is incident upon a solid-state imaging device (e.g., a CCD) 4 via a lens section 1, a diaphragm 2 and a shutter 3, thereby projecting a picture onto an imaging screen of the solid-state imaging device 4. The solid-state imaging device 4 includes a plurality of photoelectric transducers (pixels) arranged in rows and columns, and the picture is projected onto such an arrangement of pixels. The output signals from these pixels are successively sent to a picture processing section 6 via a switching module 5. A strobe 7 emits light in synchronism with the opening/closing of the shutter 3 so as to irradiate the object. A group of operation keys 8 are used by a user to operate the digital still camera.

The picture processing section 6 primarily comprises a picture memory 11, an EEPROM 12, a data table 13, a control signal producing section 14, and a processor 15. The picture memory 11 stores the output levels of the pixels of the solid-state imaging device 4, i.e., picture data representing the imaged picture. Typically, the picture memory 11 is capable of storing at least three pictures. The EEPROM 12 stores: photoelectric coefficients $a_{0R}$, $a_{0G}$, $a_{0B}$, threshold values $\Delta a_R$, $\Delta a_G$, $\Delta a_B$, and $\Delta b_R$, $\Delta b_G$, $\Delta b_B$, which are predetermined for the respective primary colors R, G and B; the reference offset output level $b_0$; and the size of the imaging screen of the solid-state imaging device 4 (represented by the number of pixels along the horizontal direction I0 times that along the vertical direction J0 on the imaging screen). The data table 13 stores various data such as data used for performing a γ correction on the picture data, and data used for performing a JPEG compression on the picture data. The control signal producing section 14 produces and outputs a control signal for controlling, in response to an instruction from the processor 15, the lens section 1, the diaphragm 2, the shutter 3, the solid-state imaging device 4, the switching module 5, the strobe 7, etc. The processor 15 controls the picture processing section 6, processes picture data and performs various other arithmetic operations.

The picture processing section 6 may be produced on a single-chip LSI.

In the digital still camera of this embodiment of the present invention, the normal shooting mode can be selected by operating the group of operation keys 8.

In the normal shooting mode, in response to an appropriate operation of the group of operation keys 8, the processor 15: drives the lens section 1 so as to focus the picture being projected onto the imaging screen of the solid-state imaging device 4 (auto-focus); adjusts the stop of the diaphragm 2; opens/closes the shutter 3; and controls the strobe 7 to emit light in synchronism with the opening/closing of the shutter 3. As a result, the picture is imaged by the solid-state imaging device 4. Then, the processor 15: receives the picture data from the solid-state imaging device 4 via the switching module 5; temporarily stores the picture data in the picture memory 11; performs image processes (e.g., a γ correction and an image compression) on the picture data; and sends the processed picture data to a recording mechanism of a recording medium (not shown). The recording mechanism records the processed picture data on the recording medium.

In the digital still camera of this embodiment of the present invention, the pixel defect detection mode can be selected by operating the group of operation keys 8. When the pixel defect detection mode is selected, the processor 15 performs the procedure illustrated in the flow chart of FIG. 4 so as to automatically detect a pixel having a defect and store the coordinate position of the pixel in the EEPROM 12. Thus, the detection of a defect pixel can be done by a user without requiring any special device or knowledge.

First, the processor 15 prepares an area in the picture memory 11 for storing three pictures, and inactivates functions such as the γ correction, the image compression, and the auto-focus of the lens section 1 (step 101). The processor 15 further drives the lens section 1 so as to set the focus of the lens section 1 to ∞, for example (step 102).

After setting the release time of the shutter 3 to zero, the switching module 5 receives the output signal from each pixel of the solid-state imaging device 4 via the switching module 5, and stores the output levels of the pixels in a first picture data storage area of the picture memory 11 (step 103).

When the release time of the shutter 3 is set to zero, the amount of light incident upon each pixel of the solid-state imaging device 4 is zero, whereby the output of each pixel is at the lowest level.

Subsequently, the processor 15 sets the diaphragm 2 to "open", and opens/closes the shutter 3, while controlling the strobe 7 to emit light in synchronism with the opening/closing of the shutter 3. Then, the processor 15 receives the output signal from each pixel of the solid-state imaging device 4 via the switching module 5, and stores the output levels of the pixels in a second picture data storage area of the picture memory 11 (step 104).

In the above-described operation, the release time of the shutter 3 is set so that an amount of light is incident upon each pixel, which brings the solid-state imaging device 4 to a near-overflow state (i.e., the amount of incident light is maximized without bringing the solid-state imaging device 4 to the overflow state), thereby maximizing the output level of the pixel. As described above, it is preferable for detecting a pixel having a defect to use a wall or a panel having a uniform gray level, so that the picture imaged by the solid-state imaging device 4 has a substantially uniform gray scale. Moreover, since the focus of the lens section 1 is adjusted to ∞, the picture imaged by the solid-state imaging device 4 is blurred to provide an even more uniform gray scale. Such a picture having a uniform gray scale is preferred in detecting a pixel having a particularly low output level (i.e., a particularly dark pixel) or a pixel having a particularly high output level (i.e., a particularly bright pixel), i.e., a pixel having a defect.

Moreover, the processor 15 sufficiently stops down the diaphragm 2, and opens/closes the shutter 3, while controlling the strobe 7 to emit light in synchronism with the opening/closing of the shutter 3. Then, the processor 15 receives the output signal from each pixel of the solid-state imaging device 4 via the switching module 5, and stores the output levels of the pixels in a third picture data storage area of the picture memory 11 (step 105).

Since the shutter 3 is opened/closed while sufficiently stopping down the diaphragm 2 with the strobe 7 emitting light, the amount of light incident upon each pixel of the solid-state imaging device 4, and thus the output level of each pixel, are between those of step 103 and those of step 104, respectively. The photographed object of the digital still camera is preferably the same in steps 104 and 105. In step 105, it is preferable to image a wall or a panel having a uniform gray level, as described above. Since the focus of the lens section 1 is adjusted to ∞, the picture imaged by the solid-state imaging device 4 is blurred to provide a uniform gray scale.

In this way, the following three output levels are stored in the picture memory 11 in steps 103, 104 and 105, respectively: the output level of each pixel of the solid-state imaging device 4 for the minimum amount of incident light; the output level of each pixel of the solid-state imaging device 4 for an intermediate amount of incident light; and the output level of each pixel of the solid-state imaging device 4 for the maximum amount of incident light.

Thus, the input/output relationship as represented by Expression (5) above (N−1=2) holds for each pixel of the solid-state imaging device 4.

Then, the processor 15 successively addresses the pixels of the solid-state imaging device 4 by successively designating addresses, i.e., the coordinate positions (i,j). Each time a coordinate position (i,j) is designated, it is determined which of the primary colors R, G and B is to be displayed by the pixel at the designated coordinate position (i,j) based on the coordinates i and j of the position, while calculating the above-described function for the addressed pixel so as to determine the presence/absence and the type of defect of the pixel.

In this embodiment of the present invention, a color filter of a primary colors Bayer pattern as illustrated in FIG. 2 is used, whereby it is possible to determine which of the primary colors R, G and B is to be displayed by the pixel at the coordinate position (i,j) based on the coordinates i and j of the position.

First, the processor 15 initializes the coordinate position (i,j) to (0,0). Moreover, the processor 15 reads out, from the EEPROM 12, various data such as: the photoelectric coefficients $a_{0R}$, $a_{0G}$, $a_{0B}$, threshold values $\Delta a_R$, $\Delta a_G$, $\Delta a_B$, and $\Delta b_R$, $\Delta b_G$, $\Delta b_B$, which are predetermined for the respective primary colors R, G and B; the reference offset output level $b_0$; and the size of the imaging screen of the solid-state imaging device 4 (represented by the number of pixels along the horizontal direction (I0-1) times that along the vertical direction (J0-1) on the imaging screen) (step 106).

Then, the processor 15 determines whether each of the coordinates i and j of the coordinate position (i,j) is an even number (steps 107, 108).

After the initialization, each of the initialized coordinates i=0 and j=0 is determined to be an even number (i.e., "yes" is given at step 107 and at step 108). In the primary colors Bayer pattern as illustrated in FIG. 2, any pixel at a coordinate position where the coordinates i and j are both an even number displays the primary color R. Therefore, the presence/absence and the type of defect of the pixel displaying the primary color R are determined (step 109).

In step 109, the processor 15 assumes the pixel at the coordinate position (0,0) to be the subject pixel, and extracts the output levels of all the necessary pixels from the three pictures of data, which have been stored in the picture memory 11 in steps 103–105, respectively. The processor 15 further determines the amount of light incident upon the subject pixel based on Expression (8) and Expression (2) above, determines the photoelectric coefficient a and the offset output level b of the subject pixel based on Expression (7) above, and determines the presence/absence and the type of defect of the subject pixel based on Expression (9) above. If the subject pixel has a defect, the type of defect (i.e., a white blemish or a black blemish) and the coordinate position of the subject pixel are stored in the picture memory 11.

Thereafter, the processor 15 determines whether the next coordinate position (i+1,j) to the right falls beyond the horizontal size (I0-1) of the imaging screen (step 110). If "No" is given at step 110, the processor 15 then adds 1 to i so as to update the coordinate position (i,j) (step 111). Then, the process returns to step 107.

The coordinate i of the updated coordinate position (i,j) is now 1, an odd number. Thus, i is determined to be an odd number ("No" is given at step 107), while j is still determined to be an even number ("Yes" is given at step 115). In the primary colors Bayer pattern as illustrated in FIG. 2, any pixel at such a coordinate position displays the primary color G. Therefore, the presence/absence and the type of defect of the pixel displaying the primary color G are determined (step 112).

In step 112, the processor 15 assumes the pixel at the coordinate position (1,0) to be the subject pixel, and extracts the output levels of all the necessary pixels from the three pictures of data, which have been stored in the picture memory 11 in steps 103–105, respectively. The processor 15 further determines the amount of light incident upon the subject pixel based on Expression (8) and Expression (2) above, determines the photoelectric coefficient a and the offset output level b of the subject pixel based on Expression (7) above, and determines the presence/absence and the type of defect of the subject pixel based on Expression (10) above. If the subject pixel has a defect, the type of defect (i.e., a white blemish or a black blemish) and the coordinate position of the subject pixel are stored in the picture memory 11.

In the primary colors Bayer pattern as illustrated in FIG. 2, the pixels at coordinate positions (i,0) alternately correspond to the primary colors R and G. Therefore, subsequently for other pixels at coordinate positions (i,0), step 109 and step 112 are alternately performed as described above so as to determine the presence/absence and the type of defect of the subject pixel at each coordinate position (i,0) while storing such data for any subject pixel having a defect.

When i+1 is equal to I0 ("Yes" is given at step 110), the processor 15 then determines whether the next coordinate position (i,j+1) below the position (i,j) falls beyond the vertical size (J0-1) of the imaging screen (step 113). If "No" is given at step 113, the processor 15 then adds 1 to j so as to update the coordinate j to 1 (step 114). Since the coordinate j is an odd number ("No" is given at step 108 and at step 115), either step 112 or step 116 is performed depending upon the determination of whether the coordinate i is an even number (step 107).

In step 112, the presence/absence and the type of defect of the pixel displaying the primary color G are determined as described above. In step 116, the presence/absence and the type of defect of the pixel displaying the primary color B are determined. For the determination, the processor 15 extracts the output levels of all the necessary pixels from the three pictures of data, which have been stored in the picture memory 11 in steps 103–105, respectively. The processor 15 further determines the amount of light incident upon the subject pixel based on Expression (8) and Expression (2) above, determines the photoelectric coefficient a and the offset output level b of the subject pixel based on Expression (7) above, and determines the presence/absence and the type of defect of the subject pixel based on Expression (11) above. If the subject pixel has a defect, the type of defect (i.e., a white blemish or a black blemish) and the coordinate position of the subject pixel are stored in the picture memory 11.

In the primary colors Bayer pattern as illustrated in FIG. 2, the pixels at coordinate positions (i,1) alternately correspond to the primary colors B and G. Therefore, subsequently for other pixels at coordinate positions (i,1), step 116 and step 112 are alternately performed as described above so as to determine the presence/absence and the type of defect of the subject pixel at each coordinate position (i,1) while storing such data for any subject pixel having a defect.

Subsequently, as the coordinate j is incremented, the coordinate i is successively varied from 0 to (I0-1) so as to determine the presence/absence and the type of defect for each pixel at a coordinate position (0-(I0-1), j). The determination of the presence/absence and the type of defect for all the pixels is complete when i+1 is determined to be equal to (I0-1) ("Yes" is given at step 110) while j+1 is determined to be equal to (J0-1) ("Yes" is given at step 113). Then, the processor 15 reads out the type of defect of each pixel having a defect and the coordinate position thereof from the picture memory 11, and stores the data in the EEPROM 12 (step 117).

When the above-described shooting mode is selected after the type of defect of each pixel of the solid-state imaging device 4 having a defect and the coordinate position thereof have been stored in the EEPROM 12, the following process is performed to correct the output level of each defect pixel.

As the normal shooting mode is selected by the operation of the group of operation keys 8, a picture is imaged by the solid-state imaging device 4, and the processor 15 receives picture data from the solid-state imaging device 4 via the switching module 5.

Figure 5:
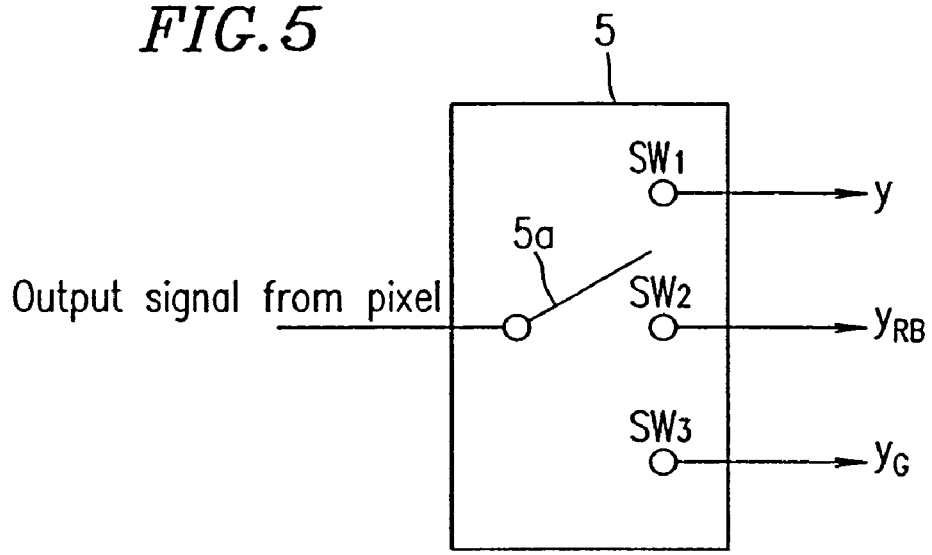
FIG. 5 is a block diagram illustrating a switching module provided in the apparatus shown in FIG. 3.
Figure 6:
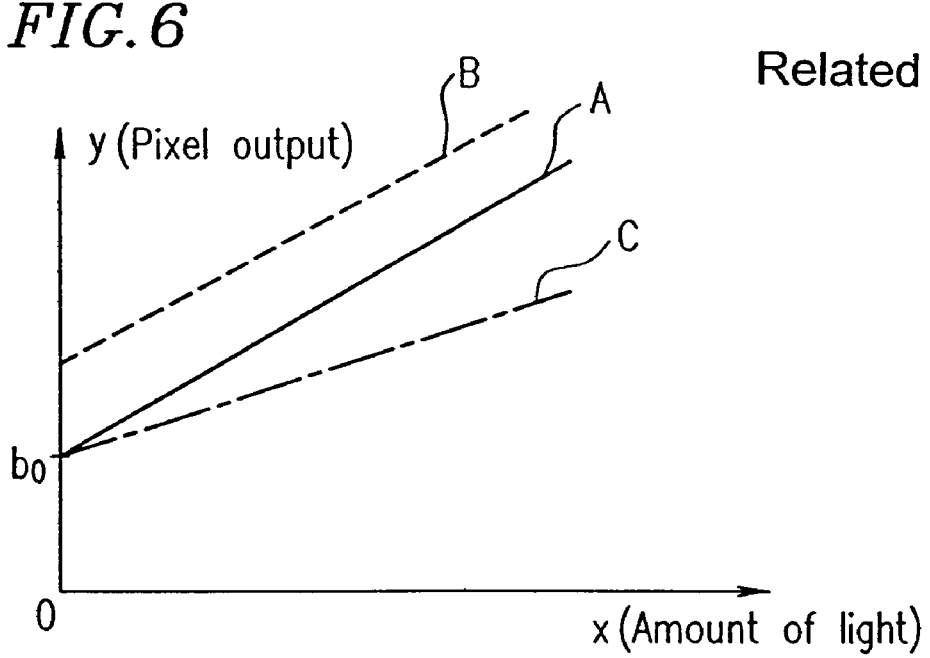
FIG. 6 is a graph illustrating input/output characteristics of a photoelectric transducer.

The switching module 5 has a structure as illustrated in FIG. 5, and comprises three terminals SW1, SW2 and SW3. When a segment 5a is switched to the terminal SW1, the output of the solid-state imaging device 4 is directly transmitted to the processor 15, thereby storing the output level of each pixel in the picture memory 11.

The processor 15 reads out the coordinate position (i,j) of a pixel having a defect from the EEPROM 12, so as to identify the color displayed by the pixel having a defect based on the coordinates i and j, and switches the switching module 5 to the terminal SW2 or SW3 at a timing at which a signal is output from the pixel. In particular, the processor 15 determines the color displayed by the pixel having a defect based on the coordinates i and j in a manner similar to that of steps 107, 108 and 115. Then, if the color displayed by the pixel is determined to be R or B, the processor 15 switches the switching module 5 to the terminal SW2 at a timing at which a signal is output from the pixel. If the color displayed by the pixel is determined to be G, the processor 15 switches the switching module 5 to the terminal SW3 at a timing at which a signal is output from the pixel.

When the processor 15 receives the output signal of a defect pixel of the primary color R or B through the terminal SW2 of the switching module 5, the processor 15 performs the calculation of Expression (13) above so as to determine the output level of the defect pixel (after data necessary for performing the calculation of Expression (13) above has been transmitted from the solid-state imaging device 4 to the picture memory 11), and stores the determined output level in an address in the picture memory 11 for the defect pixel.

When the processor 15 receives the output signal of a defect pixel of the primary color G through the terminal SW3 of the switching module 5, the processor 15 performs the calculation of Expression (14) above so as to determine the output level of the defect pixel (after data necessary for performing the calculation of Expression (14) above has been transmitted from the solid-state imaging device 4 to the picture memory 11), and stores the determined output level in an address in the picture memory 11 for the defect pixel.

Thus, by switching the segment 5a of the switching module 5 to the terminal SW1, SW2 or SW3, it is possible to correct the output level of the defect pixel in a substantially real-time manner while storing the picture data from the solid-state imaging device 4 in the picture memory 11.

Thereafter, image processes (e.g., a γ correction and an image compression) are performed on the picture data stored in the picture memory 11, and the processed picture data is sent to a recording mechanism of a recording medium (not shown) so as to record the processed picture data on the recording medium.

Figure 4:
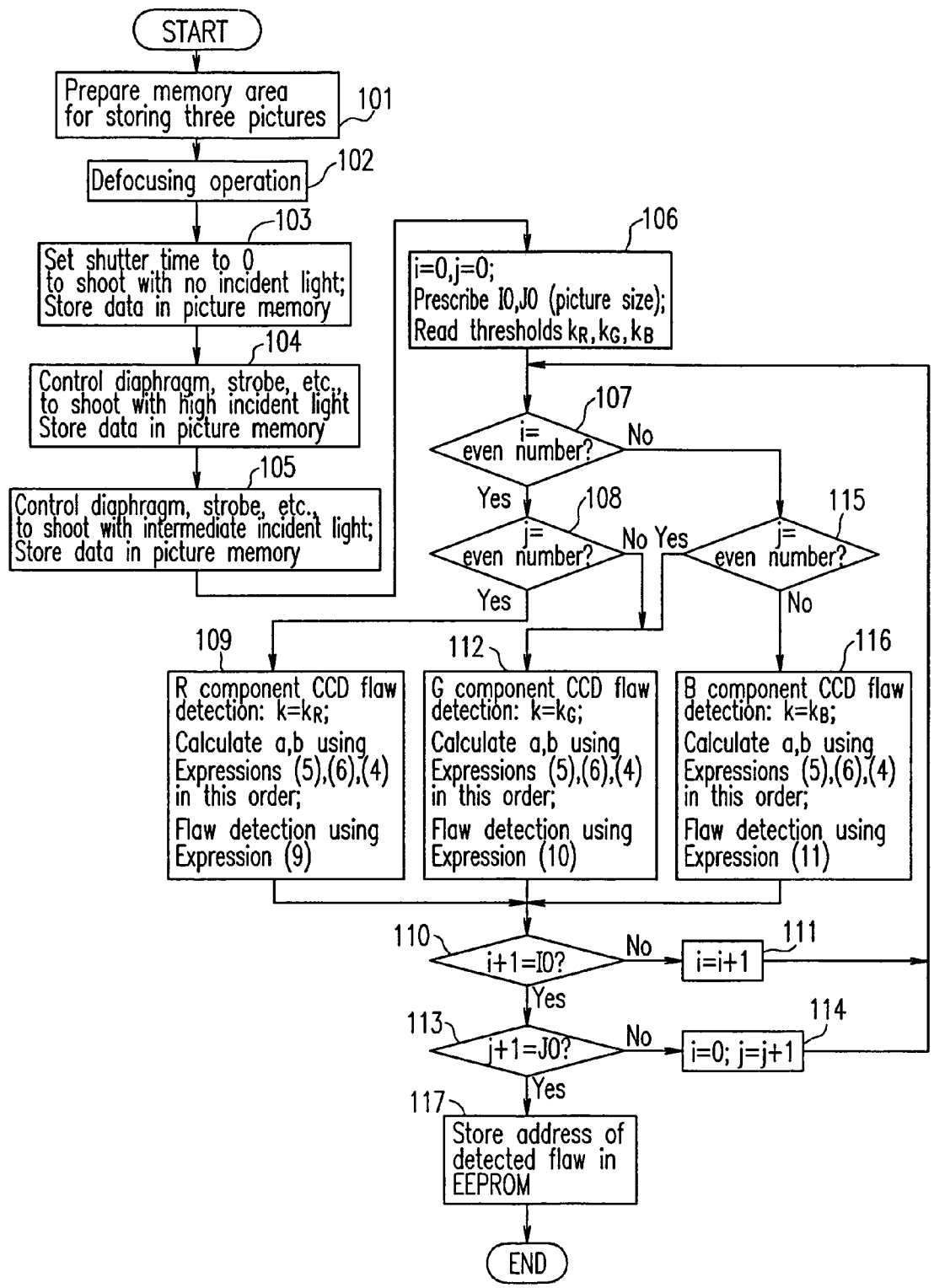
FIG. 4 is a flow chart illustrating a procedure performed by the apparatus shown in FIG. 3.

Instead of determining the color displayed by the pixel having a defect based on the coordinates i and j in a manner similar to that of steps 107, 108 and 115 as illustrated in FIG. 4, it is possible to perform the determination while utilizing the fact that i or j is an even number when the least significant bit thereof is "0", and is an odd number when it is "1". Thus, the color displayed by the pixel is determined to be R or B if the XOR between i and j is false, and G if it is true.

While the above-described pixel defect detection mode is selected, the segment 5a is always connected to the terminal SW1.

As is apparent from the description above, with the digital still camera of this embodiment of the present invention, it is possible to automatically detect the coordinate position of a pixel having a defect and the type of defect and correct the output signal of the defect pixel, only by obtaining three pictures of data through multiple picture shooting operations, without requiring a reference light generator, a special aided system, or the like. Therefore, even a user can easily perform the detection and correction of defect pixels.

The present invention is not limited to the above-described particular embodiment. Various modifications can be made to the above-described embodiment. For example, while the photoelectric coefficient a and the offset output level b of each pixel are determined based on three output levels therefrom in response to three different amounts of incident light, respectively, in the above-described embodiment, the photoelectric coefficient a and the offset output level b may alternatively be determined based on two or four output levels for two or four different amounts of incident light.

When the photoelectric coefficient a and the offset output level b are determined based on two output levels for two different amounts of incident light, Expressions (5), (6) and (7) above may be unnecessary. Instead, the photoelectric coefficient a and the offset output level b may be obtained by determining two different amounts of incident light based on Expressions (8) and (2) and detecting two output levels from a pixel in response to the two amounts of incident light.

In the above-described embodiment, an output of a pixel is approximated by a linear function so that the scale of the arithmetic circuit, the amount of calculation and the time required for calculation are within the practical range. Strictly speaking, the output characteristic of a photoelectric transducer is non-linear. When it is difficult to approximate the output characteristic of the photoelectric transducer with a single linear function, a combination of a plurality of linear functions or another type of function may be used provided that the possible increase in the scale of the arithmetic circuit, the amount of calculation and the time required for calculation is minimized. With any type of function being used, the presence/absence and the type of defect of a pixel can be determined by representing the actual output characteristic of the pixel in the function and comparing the coefficients of the function with one another.

The output level of a normal pixel may alternatively be determined by any appropriate means other than the use of the median filter of Expression (8) above. For example, the output level of a normal pixel may be determined by using the median filter after excluding the maximum and minimum output levels among those of the pixels neighboring the subject pixel within the same pixel region, or alternatively by performing a well-known statistical operation on the output levels of the pixels neighboring the subject pixel within the same pixel region. Moreover, various pixel regions may be prescribed surrounding the subject pixel, other than those described above.

While a CCD is described as an exemplary solid-state imaging device in the above-described embodiment, the present invention is not limited thereto. For example, the present invention may alternatively be used for other types of solid-state imaging device such as CID or CPD. Moreover, the present invention may alternatively be used for solid-state imaging apparatuses other than a digital still camera, such as a video camera, or a film scanner.

While a color filter of a primary colors Bayer pattern is described in the above-described embodiment, the present invention may alternatively be used with other types of color filter in which primary colors and complementary colors are arranged according to a given rule.

As described above, according to the present invention, output characteristics of a subject photoelectric transducer in response to varied amounts of light incident upon the subject photoelectric transducer are determined, so as to detect a defect in the subject photoelectric transducer based on the output characteristics.

Alternatively, according to the present invention, outputs of a subject photoelectric transducer in response to different amounts of incident light may be stored in the picture memory so as to determine the photoelectric coefficient a of the subject photoelectric transducer and the offset output level b of the subject photoelectric transducer in the absence of incident light, based on the amounts of incident light, the outputs of the subject photoelectric transducer therefor, and Expression (1). A defect in the subject photoelectric transducer is detected by comparing the photoelectric coefficient a and the offset output level b with a predetermined reference photoelectric coefficient $a_0$ and a predetermined reference offset output level $b_0$, respectively.

$$y(x)=ax+b \qquad (1)$$

Herein, y(x) denotes the output of the subject photoelectric transducer, and x denotes the amount of incident light.

As described above, the output characteristic of the subject photoelectric transducer is determined, so as to detect a defect of the subject photoelectric transducer based on the output characteristic. In this way, a reference light generator, a special aided system, or the like, as in the prior art, is not required, whereby even an ordinary user can easily detect a defect of a photoelectric transducer. Not only the presence/absence of the defect, but also the type of defect, can be determined.

Moreover, according to the present invention, the output of a photoelectric transducer is determined while the solid-state imaging device is defocused. Therefore, a substantially uniform light is incident upon a pixel region surrounding the subject photoelectric transducer. Therefore, it is possible to identify the output signal of a normal photoelectric transducer based on output signals from a plurality of photoelectric transducers in the same pixel region, thereby estimating the actual amount of incident light.

Furthermore, an amount of incident light which is measured when no light is incident upon the solid-state imaging device, and another amount of incident light which brings the solid-state imaging device to a near-overflow state. These amounts of incident light can easily be obtained by appropriately controlling the shutter speed, the diaphragm, the strobe, and the like, of a video camera or a digital still camera.

For a color display, photoelectric transducers for different colors are separately examined. Therefore, it is possible to accurately determine the presence/absence and the type of defect of the photoelectric transducer.

Moreover, for a color display, the color displayed by each pixel is determined based on address data (i.e., the coordinate position) of the pixel, thereby allowing the calculation to be performed faster.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A pixel defect detector for a solid-state imaging device comprising a plurality of photoelectric transducers, the pixel defect detector comprising:

a calculation section for obtaining output characteristics of a subject photoelectric transducer for at least three amounts of light incident thereupon so as to determine the presence/absence of a defect in the subject photoelectric transducer based on the output characteristics thereof, wherein an output corresponding to a non-defective photoelectric transducer is calculated based on outputs from a plurality of photoelectric transducers neighboring the subject photoelectric transducer for at least one of the amounts of incident light without requiring specific amounts of incident light, and the calculated output corresponding to a non-defective transducer is used in determining the presence/absence of a defect in the subject photoelectric transducer.

2. A pixel defect detector for a solid-state imaging device according to claim 1, wherein:
the pixel defect detector further comprises a picture memory for storing an output signal from the photoelectric transducer; and
the calculation section determines the output characteristics of the subject photoelectric transducer using the output signal of the subject photoelectric transducer stored in the picture memory.

3. A pixel defect detector for a solid-state imaging device according to claim 1, wherein:
the output characteristics of the subject photoelectric transducer are represented by a plurality of output signals of the subject photoelectric transducer in response to different amounts of light incident thereupon, respectively.

4. A pixel defect detector for a solid-state imaging device according to claim 1, wherein:
the pixel defect detector further comprises an optical system for projecting a picture onto the solid-state imaging device; and
the output of the photoelectric transducer is determined while the optical system is defocused with respect to the solid-state imaging device.

5. A pixel defect detector for a solid-state imaging device comprising a plurality of photoelectric transducers, the pixel defect detector comprising:
a picture memory for storing outputs from a subject photoelectric transducer in response to different amounts of light incident thereupon, respectively; and
a calculation section for determining a photoelectric coefficient a of the subject photoelectric transducer and an offset output level b of the subject photoelectric transducer in the absence of incident light based on the amounts of incident light, the outputs from the subject photoelectric transducer therefor, and Expression (1) below, so as to compare the photoelectric coefficient a and the offset output level b with a predetermined reference photoelectric coefficient $a_0$ and predetermined reference offset output level $b_0$, respectively, thereby determining the presence/absence of a defect in the subject photoelectric transducer:

$$y(x)=ax+b \tag{1}$$

where y(x) denotes the output of the subject photoelectric transducer, and x denotes the amount of incident light, wherein
an output corresponding to a non-defective photoelectric transducer is calculated based on outputs from a plurality of photoelectric transducers neighboring the subject photoelectric transducer for at least one of the amounts of incident light without requiring specific amounts of incident light, and
the calculated output corresponding to a non-defective transducer is used in determining the presence/absence of a defect in the subject photoelectric transducer.

6. A pixel defect detector for a solid-state imaging device according to claim 5, wherein:
the pixel defect detector further comprises an optical system for projecting a picture onto the solid-state imaging device; and
the output of the photoelectric transducer is determined while the optical system is defocused with respect to the solid-state imaging device.

7. A pixel defect detector for a solid-state imaging device according to claim 5, wherein:
the amount of incident light x is determined by applying, to Expression (2) below, the predetermined reference photoelectric coefficient $a_0$, the predetermined reference offset output level $b_0$, and a reference output signal $y_0$:

$$x=(y_0-b_0)/a_0 \tag{2}.$$

8. A pixel defect detector for a solid-state imaging device according to claim 5, wherein N amounts of incident light $x_0, x_1, x_2, \ldots, x_{n-1}$ of the subject pixel to be examined and the actual output levels $y_0, y_1, y_2, \ldots, y_{n-1}$ of the subject pixel to be examined, obtained respectively for each of the N amounts of incident light are substituted into the following expression (7)

$$\begin{bmatrix} \sum x_i^2 & \sum x_i \\ \sum x_i & N \end{bmatrix} \begin{bmatrix} a \\ b \end{bmatrix} = \begin{bmatrix} \sum x_i y_i \\ \sum y_i \end{bmatrix} \tag{7}$$

to find a photoelectric coefficient a and an offset output level b of the subject pixel to be examined.

9. A pixel defect detector for a solid-state imaging device comprising a plurality of photoelectric transducers, the pixel defect detector comprising:
a picture memory for storing outputs from a subject photoelectric transducer in response to different amounts of light incident thereupon, respectively; and
a calculation section for determining a photoelectric coefficient a of the subject photoelectric transducer and an offset output level b of the subject photoelectric transducer in the absence of incident light based on the amounts of incident light, the outputs from the subject photoelectric transducer therefor, and Expression (1) below, so as to compare the photoelectric coefficient a and the offset output level b with a predetermined reference photoelectric coefficient $a_0$ and predetermined reference offset output level $b_0$, respectively, thereby determining the presence/absence of a defect in the subject photoelectric transducer:

$$y(x)=ax+b \tag{1}$$

where y(x) denotes the output of the subject photoelectric transducer, and x denotes the amount of incident light, wherein
an output corresponding to a non-defective photoelectric transducer is calculated based on outputs from a plurality of photoelectric transducers neighboring the subject photoelectric transducer for at least one of the amounts of incident light,
the amount of incident light x is determined by applying, to Expression (2) below, the predetermined reference photoelectric coefficient $a_0$, the predetermined reference offset output level $b_0$, and a reference output signal $y_0$:

$$x=(y_0-b_0)/a_0 \tag{2), and}$$

the output $y_0$ is set to a median among outputs from the plurality of photoelectric transducers neighboring the subject photoelectric transducer.

10. A pixel defect detector for a solid-state imaging device according to claim 9, wherein:
the neighboring photoelectric transducers comprise only those which display the same one of a plurality of colors to be displayed as that of the subject photoelectric transducer.

11. A pixel defect detector for a solid-state imaging device according to claim 9, wherein N amounts of incident light $x_0, x_1, x_2, \ldots, x_{n-1}$ of the subject pixel to be examined and the actual output levels $y_0, y_1, t_2, \ldots, y_{n-1}$ of the subject pixel to be examined, obtained respectively for each of the N amounts of incident light are substituted into the following expression (7)

$$\begin{bmatrix} \sum x_i^2 & \sum x_i \\ \sum x_i & N \end{bmatrix} \begin{bmatrix} a \\ b \end{bmatrix} = \begin{bmatrix} \sum x_i y_i \\ \sum y_i \end{bmatrix} \qquad (7)$$

to find a photoelectric coefficient a and an offset output level b of the subject pixel to be examined.

12. A pixel defect detector for a solid-state imaging device comprising a plurality of photoelectric transducers, the pixel defect detector comprising:
a picture memory for storing outputs from a subject photoelectric transducer in response to different amounts of light incident thereupon, respectively; and
a calculation section for determining a photoelectric coefficient a of the subject photoelectric transducer and an offset output level b of the subject photoelectric transducer in the absence of incident light based on the amounts of incident light, the outputs from the subject photoelectric transducer therefor, and Expression (1) below, so as to compare the photoelectric coefficient a and the offset output level b with a predetermined reference photoelectric coefficient $a_0$ and predetermined reference offset output level $b_0$, respectively, thereby determining the presence/absence of a defect in the subject photoelectric transducer:

$$y(x)=ax+b \qquad (1)$$

where y(x) denotes the output of the subject photoelectric transducer, and x denotes the amount of incident light, wherein
an output corresponding to a non-defective photoelectric transducer is calculated based on outputs from a plurality of photoelectric transducers neighboring the subject photoelectric transducer for at least one of the amounts of incident light, and
the presence/absence of a defect in the subject photoelectric transducer is determined by applying the photoelectric coefficient a of the subject photoelectric transducer, the offset output level b of the subject photoelectric transducer, the reference photoelectric coefficient $a_0$, and the reference offset output level $b_0$, to Expression (3) below:

no defect, if $|a_0-a|<\Delta a$ and $|b_0-b|<\Delta b$ \qquad (3)

where $\Delta a$ and $\Delta b$ are predetermined threshold values.

13. A pixel defect detector for a solid-state imaging device according to claim 12, wherein:
the reference photoelectric coefficient $a_0$ and the reference offset output level $b_0$ are prescribed for each of the colors to be displayed.

14. A pixel defect detector for a solid-state imaging device according to claim 12, wherein:
the pixel defect detector further comprises a determination section for determining a color to be displayed by the subject photoelectric transducer based on address data of the subject photoelectric transducer; and
the reference photoelectric coefficient $a_0$ and the reference offset output level $b_0$ are proscribed based on the determination by the determination section.

15. A pixel defect detector for a solid-state imaging device comprising a plurality of photoelectric transducers, the pixel defect detector comprising:
a picture memory for storing outputs from a subject photoelectric transducer in response to different amounts of light incident thereupon, respectively; and
a calculation section for determining a photoelectric coefficient a of the subject photoelectric transducer and an offset output level b of the subject photoelectric transducer in the absence of incident light based on the amounts of incident light, the outputs from the subject photoelectric transducer therefor, and Expression (1) below, so as to compare the photoelectric coefficient a and the offset output level b with a predetermined reference photoelectric coefficient $a_0$ and predetermined reference offset output level $b_0$, respectively, thereby determining the presence/absence of a defect in the subject photoelectric transducer:

$$y(x)=ax+b \qquad (1)$$

where y(x) denotes the output of the subject photoelectric transducer, and x denotes the amount of incident light, wherein
an output corresponding to a non-defective photoelectric transducer is calculated based on outputs from a plurality of photoelectric transducers neighboring the subject photoelectric transducer for at least one of the amounts of incident light, and
the presence/absence and the type of defect in the subject photoelectric transducer are determined by applying the photoelectric coefficient a of the subject photoelectric transducer, the offset output level b of the subject photoelectric transducer, the reference photoelectric coefficient $a_0$, and the reference offset output level $b_0$, to Expression (4) below:

no defect, if $|a_0-a|<\Delta a$ and $|b_0-b|<\Delta b$;

a black blemish, if $|a_0-a|\geq\Delta a$; and a white blemish, if $|b_0-b|\geq\Delta b$ \qquad (4)

where $\Delta a$ and $\Delta b$ are predetermined threshold values.

16. A pixel defect detector for a solid-state imaging device according to claim 15, wherein:
the reference photoelectric coefficient $a_0$ and the reference offset output level $b_0$ are prescribed for each of the colors to be displayed.

17. A pixel defect detector for a solid-state imaging device according to claim 15, wherein:
the pixel defect detector further comprises a determination section for determining a color to be displayed by the subject photoelectric transducer based on address data of the subject photoelectric transducer; and
the reference photoelectric coefficient $a_0$ and the reference offset output level $b_0$ are prescribed based on the determination by the determination section.

* * * * *